United States Patent [19]

Christensen et al.

[11] Patent Number: 4,761,783
[45] Date of Patent: Aug. 2, 1988

[54] APPARATUS AND METHOD FOR REPORTING OCCURRENCES OF ERRORS IN SIGNALS STORED IN A DATA PROCESSOR

[76] Inventors: Harold F. Christensen, 38455 Berkeley Commons, Fremont, Calif. 94536; Joseph A. Petolino, Jr., 3730 Redwood Cir., Palo Alto, Calif. 94306

[21] Appl. No.: 920,522

[22] Filed: Oct. 17, 1986

[51] Int. Cl.[4] ........................................... G06F 11/10
[52] U.S. Cl. .................................................. 371/38
[58] Field of Search ..................... 371/38, 51; 364/200, 364/900

[56] References Cited

U.S. PATENT DOCUMENTS

| | | | |
|---|---|---|---|
| 4,493,081 | 1/1985 | Schmidt | 371/38 |
| 4,604,750 | 8/1986 | Manton et al. | 371/38 |
| 4,625,273 | 11/1986 | Woffinden et al. | 364/200 |
| 4,646,312 | 2/1987 | Goldsbury et al. | 371/38 |
| 4,651,321 | 3/1987 | Woffinden et al. | 371/38 |

Primary Examiner—Charles E. Atkinson

[57] ABSTRACT

The present invention provides an apparatus for reporting errors in data stored in a memory apparatus of a data processor, comprising: first circuitry for storing multiple digital first signals; second circuitry for storing the multiple digital first signals and adapted for storing at least one digital second signal; third circuitry for transmitting the multiple digital first signals substantially from the first circuitry to the second circuitry; fourth circuitry for providing the at least one digital second signal, in the course of the transmitting of the first signals by the third circuitry, in response to an occurrence of one or more errors in one or more of the multiple digital first signals; fifth circuitry for transmitting the multiple digital first signals substantially from the second circuitry to the first means; and sixth circuitry adapted for receiving the at least one digital second signal in the course of the transmitting of the multiple digital first signals by the fifth circuitry and for providing at least one third signal in response to an occurrence of the at least one digital second signal.

11 Claims, 2 Drawing Sheets

FIG.-2

APPARATUS AND METHOD FOR REPORTING OCCURRENCES OF ERRORS IN SIGNALS STORED IN A DATA PROCESSOR

BACKGROUND OF THE INVENTION

1. Field of the Invention

The invention relates generally to apparatus for controlling the storage of data in a data processor and more particularly, to apparatus for detecting and reporting errors in data stored in a data processor.

2. Description of the Related Art

A typical data processor includes a central processing unit (CPU) which executes instructions which either process data or cause the transfer of data among different functional units of the data processor. A main storage unit having a relatively large storage capacity ordinarily stores programs and data used by the programs. Data to be processed by the central processing unit ordinarily is transferred from the main storage unit to a cache memory before processing actually begins. The cache memory interfaces directly with the central processing unit. Usually, the cache has a relatively low storage capacity but operates at relatively high speed to provide the data to the central processing unit for use during execution of a corresponding program.

Frequently, a variety of processes share the use of the CPU. Moreover, often the CPU interrupts the execution of a program corresponding to a first active process in order to execute a program corresponding to a second process which takes precedence over the first active process. In order to execute the program corresponding to the second process, however, it ordinarily is necessary for the data corresponding to the second process to be moved into the cache. Consequently, often it is necessary to move out the data corresponding to the first process from the cache in order to make room for the data corresponding to the second process. Typically, the data corresponding to the first process is moved into the main storage unit for storage during execution by the CPU of the program corresponding to the second process.

Subsequently, after the CPU has executed the program corresponding to the second process, the data corresponding to the first process, once again can be moved into the cache. Moreover, a typical data processor ordinarily includes a data storage control system which controls the transfer of data between the cache and the main storage unit such that data associated with programs actively being executed by the central processing unit can be moved into the cache, and data associated with processes to be executed later by the CPU can be moved out of the cache and into the main storage unit.

One problem associated with the storage of data by a data processor in general, and associated with the transfer of data between the cache and the main storage unit in particular, stems from the occurrence of errors in the stored data. Errors are manifested, for example, as unwanted changes in the binary state of bits within a byte or line of data. Errors can occur in a variety of locations such as in the cache, in the main storage unit or in the course of transferring the data between the cache and the main storage unit. Since data errors detrimentally affect the performance of the data processor, the data storage control system ordinarily includes components directed to detecting and reporting such errors.

For example, in the past, error checking and correcting (ECC) codes frequently were used to detect errors occurring in data stored in the cache and to correct certain of the errors. More specifically, an ECC code was generated each time data was moved into the cache. The ECC code, for example, could comprise a set of single bit binary signals, each of which represented a parity bit covering a particular set of data bits, each respective data bit being covered by more than one ECC code bit. The ECC code was stored in conjunction with the corresponding data. Subsequently, when the data was moved out of the cache, the ECC code was used to detect the occurrence of errors in the data and to correct certain of those errors.

Since the cache and the main storage unit often were physically spaced apart within the data processor by a relatively significant distance, errors often could occur in the course of the transfer. Consequently, the data typically was covered by parity during the transfer in order to detect occurrences of errors in the course of the transfer.

For example, commonly assigned U.S. Pat. No. 4,625,773 issued Nov. 25, 1986 entitled, APPARATUS FOR FAST DATA STORAGE WITH DEFERRED ERROR REPORTING and commonly assigned continuation application Ser. No. 790,269 filed Oct. 22, 1985 now abandoned and entitled, APPARATUS FOR STORING DATA WITH DEFERRED UNCORRECTABLE ERROR REPORTING which is a continuation of commonly assigned application Ser. No. 527,671, filed Aug. 30, 1983 and now abandoned generally pertain to the reporting of errors present or occurring in the course of the move-out of data signals from a cache to a main storage unit. Moreover, the apparatus described in the aforementioned patent applications defer the reporting of errors until the data is to be moved back into the main storage unit. Unfortunately, the earlier apparatus often did not distinguish between errors occurring in the data signals in the course of the move-out of the data signals from the cache to the main storage unit and errors occurring in the course of the storage of the data signals in the main storage unit.

Thus, there has been a need for an apparatus for detecting and reporting errors present or occurring in data signals in the course of the move-out of the signals from a cache to a main storage unit and for distinguishing between those errors and errors occurring in the course of the storage of the data signals in the main storage unit. The present invention meets this need.

SUMMARY OF THE INVENTION

The present invention provides an apparatus for reporting errors in digital data signals stored in a data storage unit of a data processor. The apparatus includes first storage circuitry for storing the data signals and second storage circuitry for storing both the data signals and digital error recording signals. Conductors are included for conducting the data signals from the first storage circuitry to the second storage circuitry, and additional conductors are included for conducting the data signals from the second storage circuitry to the first storage circuitry. Error detecting circuitry is included for providing digital error recording signals in the course of the transfer of the data signals from the first storage circuitry to the second storage circuitry. Moreover, reporting circuitry is included for receiving the digital error recording signals in the course of the transfer of the data signals from the second storage circuitry to the first storage circuitry and for providing an error reporting signal in response to the digital error recording signal in response to the digital error recording signals. Moreover, further error detecting circuitry is included for detecting occurrences of errors in the signals stored in the second circuitry. Additionally, correction circuitry is provided for correcting single bit errors detected by the further error detecting circuitry.

The present invention also provides a method for reporting occurrences of errors in data signals transferred from first storage circuitry to second storage circuitry in a data storage unit of a data processor. The method comprises the step of storing the data signals in the first storage circuitry and then transmitting them from the first storage circuitry to the second storage circuitry. In the course of transmitting the data signals from the first storage circuitry to the second storage circuitry, the transmitted data signals are tested in order to detect occurrences of one or more errors in the data signals. Digital second signals are provided in response to a detection of an occurrence of one or more errors in the data signals. The data signals and the second signals are stored by the second storage circuitry. Subsequently, the data signals are transmitted from the second to the first storage circuitry. In the course of the transmission from the second to the first circuitry, the provision of the error signals is reported. Moreover, in the course of the transmission from the second to the first circuitry, the data signals and the second signals are tested for occurrences of errors during storage by the second circuitry, and detected single bit errors which occurred during storage by the second circuitry are corrected.

These and other features and advantages of the present invention will become more apparent from the following detailed description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which:

FIG. 2 illustrates an array which illustrates a relationship between certain digitally encoded signals shown in FIG. 1.

DETAILED DESCRIPTION OF THE PREFERRED EMBODIMENT

Figure 1:
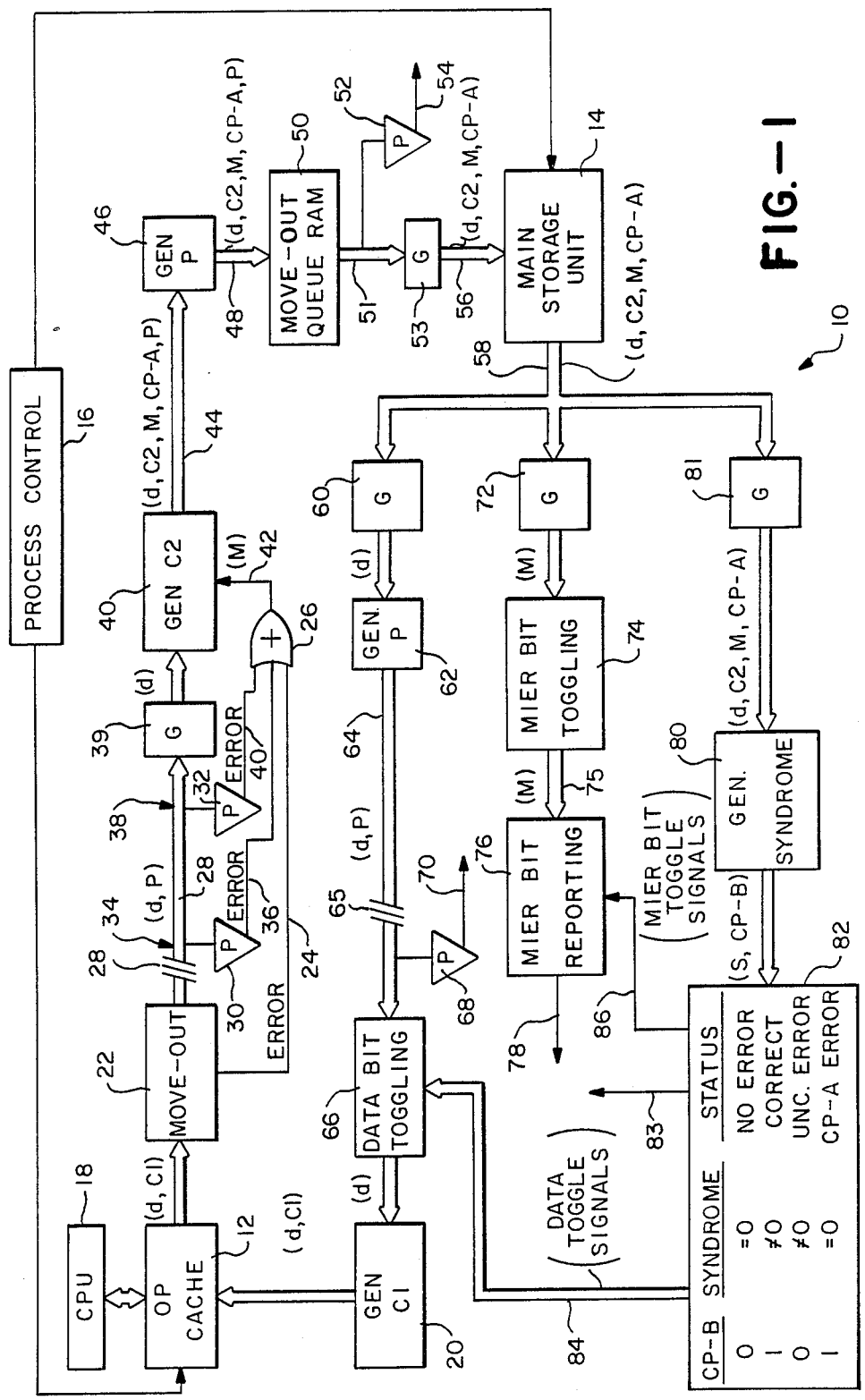
FIG. 1 is a data flow diagram illustrating the flow of digitally encoded signals within a data storage unit incorporating a presently preferred embodiment of the invention.

The present invention comprises a novel apparatus for reporting errors in data stored in a memory apparatus of a data processor and an associated method for reporting an occurrence of one or more errors transmitted within a memory apparatus of a data processor. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

FIG. 1 provides an exemplary data flow diagram which illustrates the flow of digitally encoded signals, in accordance with the present invention, within a data storage unit 10 of a data processor. The data storage unit 10 includes an operand cache memory unit (op-cache) 12 and a main storage unit 14. The op-cache 12 is coupled to the main storage unit 14 so that data (represented by the letter (d) stored in the op-cache 12 can be transferred to the main storage unit 14 for storage. Moreover, the coupling is accomplished such that the data (d), after storage in the main storage unit 14, can be transferred back to the op-cache 12. The transfer of data (d) between the op-cache 12 and the main storage unit 14 is controlled by process control circuitry 16 which forms no part of the present invention and which need not be described in detail herein.

The op-cache 12 typically serves as a temporary storage location for operand data (d) communicated with a central processing unit (CPU) 18 of the data processor. The op-cache 12 ordinarily operates as a high speed memory interfacing directly with the CPU 18. Usually, the amount of memory space available in the op-cache 12 is substantially less than that available in the main storage unit 14. Thus, the op-cache 12 can store only a relatively limited amount of data (d).

At times, a first process actively using the CPU 18 is interrupted so that a second process, which takes precedence over the first process, can use the CPU 18. When such an interruption occurs, it is necessary to move data (d) corresponding to the first process out of the op-cache 12 and to transfer that data (d) to the main storage unit 14 in order to make room in the op-cache 12 for new data corresponding to the precedence-taking second process. The process control circuitry 16 controls the transfer of data (d) between the op-cache 12 and the main storage unit 14.

The data (d) is stored in conjuction with first error checking and correcting (ECC) code comprising a first set of check bits (C1). More particularly, before the data (d) is provided to the op-cache 12, it is provided to first check bit generating circuitry 20 which generates the first set of ECC code check bits (C1). The data (d) is stored in the op-cache 12, and the first set of check bits (C1) are stored in conjunction with the data (d).

Each check bit in the first set of ECC code check bits (C1) acts as a parity bit over a group of data bits stored in the op-cache 12, and each data bit is covered by a unique pattern of check bits. Upon transfer of the data (d) from the op-cache 12 to the main storage unit 14, the first set of check bits (C1) is used to detect errors in the data (d) and to correct certain of those errors.

The manner in which the set of first check bits (C1) is generated and the manner in which the first set of check bits (C1) is used to detect errors and to correct certain of the errors in the data (d) forms no part of the present invention and will be understood by those skilled in the art. Moreover, the manner of generating and using the first set of check bits (C1) is similar to the manner of generating and using a second set of check bits (C2) which is discussed and explained more fully below in connection with the storage of the data signals (d) in the main storage unit 14.

More specifically, in the course of the transfer of the data signals (d) from the op-cache 12 to the main storage unit 14, the op-cache 12 provides the data signals and the first set of check bits (d, C1) to first move-out circuitry 22 which uses the first set of check bits (C1) to detect the occurrence of errors in the data signals (d), to correct single bit errors in the data signals and to report (uncorrectable) multiple bit errors in the data signals on line 24 to OR gate 26. Additionally, the first move-out circuitry 22 applies parity signals (p) to the data signals (d) provided by the op-cache 12. It then provides the data signals with parity (d, p) on cable lines 28.

The cable lines 28 extend substantially between the op-cache 12 and the main storage unit 14. The op-cache 12 and the main storage unit 14 are spatially separated by a significant distance. Thus, the length of the cable lines 28 is relatively long. Unfortunately, cable lines often can be relatively low reliability components which can be susceptible to occurrences of errors in data signals conducted by the cable lines. Consequently, it is necessary to test for occurrences of errors occurring in the course of data signal (d) transmission along the cable lines 28. Thus, parity checking circuits 30 and 32 are coupled to logic paths 29 coupled to the cable lines 28 which conduct the data signals (d) from the cable lines 28 to the main storage unit 14. The parity checking circuits 30 and 32 check for occurrences of parity errors in the data signals (d). It will be appreciated that the provision of multiple temporally spaced parity checking circuits 30 and 32 serves to distinguish occurrences of errors along the logic paths 29 from occurrences of errors along the cable lines 29. This distinguishing facilitates diagnostic procedures, which form no part of the present invention, directed to diagnosing the source and cause of such parity errors.

In the event that parity checking circuit 30 detects a parity error in data signals (d) at a first location generally indicated by arrow 34 along the cable lines 28, then it provides an error signal on line 36 to the OR gate 26. Similarly, in the event that parity checking circuit 32 detects a parity error in data signals (d) at a second location generally indicated by arrow 38 then it provides an error signal on line 40 to the OR gate 26. Although only two parity checking circuits, 30 and 32, are shown in the illustrative drawings of FIG. 1, it will be appreciated that more parity checking circuits can be provided if desired.

Data signals (d) on the logic path 28, are provided via gate 39 together with a move-in error (MIER) bit (M) provided by the OR gate 26 on line 42, to second check bit generating circuitry 40. The gate 39 removes the parity bits (p) from the data signals (d) and provides the data signals to the generating circuitry 40. The MIER bit (M) provided on line 42 represents a record of occurrences of uncorrectable errors in the data signals (d) while stored in the op-cache 12 and in the course of their transfer on cable lines and logic path 28. Since the MIER bit is generated in the course of transfer of particular data signals (d), errors recorded by the MIER bit are identified with those particular data signals (d) which generated the bit. The second check bit generating circuitry 40, in turn, provides on lines 44 the data signals (d), the MIER bit (M) a second set of ECC code check bits (C2), and new parity signals (p) (covering the data signals the second set of check bits and the MIER bit (d, C2, M)).

An understanding of the method and apparatus of the present invention will be facilitated by a further explanation of the manner in which data plus parity (d, p) is conducted on cable lines 28 between the op-cache 12 and the main storage unit 14. More particularly, data signals (d) are stored in the op-cache 12 in 64-byte wide lines. Each line of data signals is transferred to the main storage unit 14 in four flows, each flow comprising 16-bytes of data. Each 16-byte flow includes four 4-byte checking blocks, and each byte includes eight bits of data. Each individual byte of each 4-byte checking block is covered by one parity bit in the course of its transfer on the cable lines 28. Thus, there are four parity bits per 4-byte checking block. The cable lines 28, illustrated in FIG. 1, therefore, represent a plurality of cables suitable for conducting in parallel sixteen eight bit bytes of data plus one parity bit per byte. The four flows of 16-bytes are transferred in serial between the op-cache 12 and the main storage unit 14.

For each flow of data signals (d) transferred on the cable lines 28, a respective MIER bit (M) is generated. A copy of the MIER bit then is generated for each of the four checking blocks in each flow. Although the drawings of FIG. 1 illustrate circuitry associated with only one respective checking block, it will be appreciated that similar circuitry which is not shown is associated with the three respective remaining checking blocks of the flow.

Moreover, it will be understood that the logical state of the MIER bit provided on line 42 will depend upon whether error signals are provided on either of lines 24, 36 or 40. If an error signal is provided on any one or more of those three lines then the logical state of the MIER bit will be a logical one indicating the occurrence of one or more errors in the respective checking block; conversely, if no error signals are provided on any of lines 24, 36 or 40 then the logical state of the MIER bit will be a logical zero indicating no error occurrences.

Figure 2:
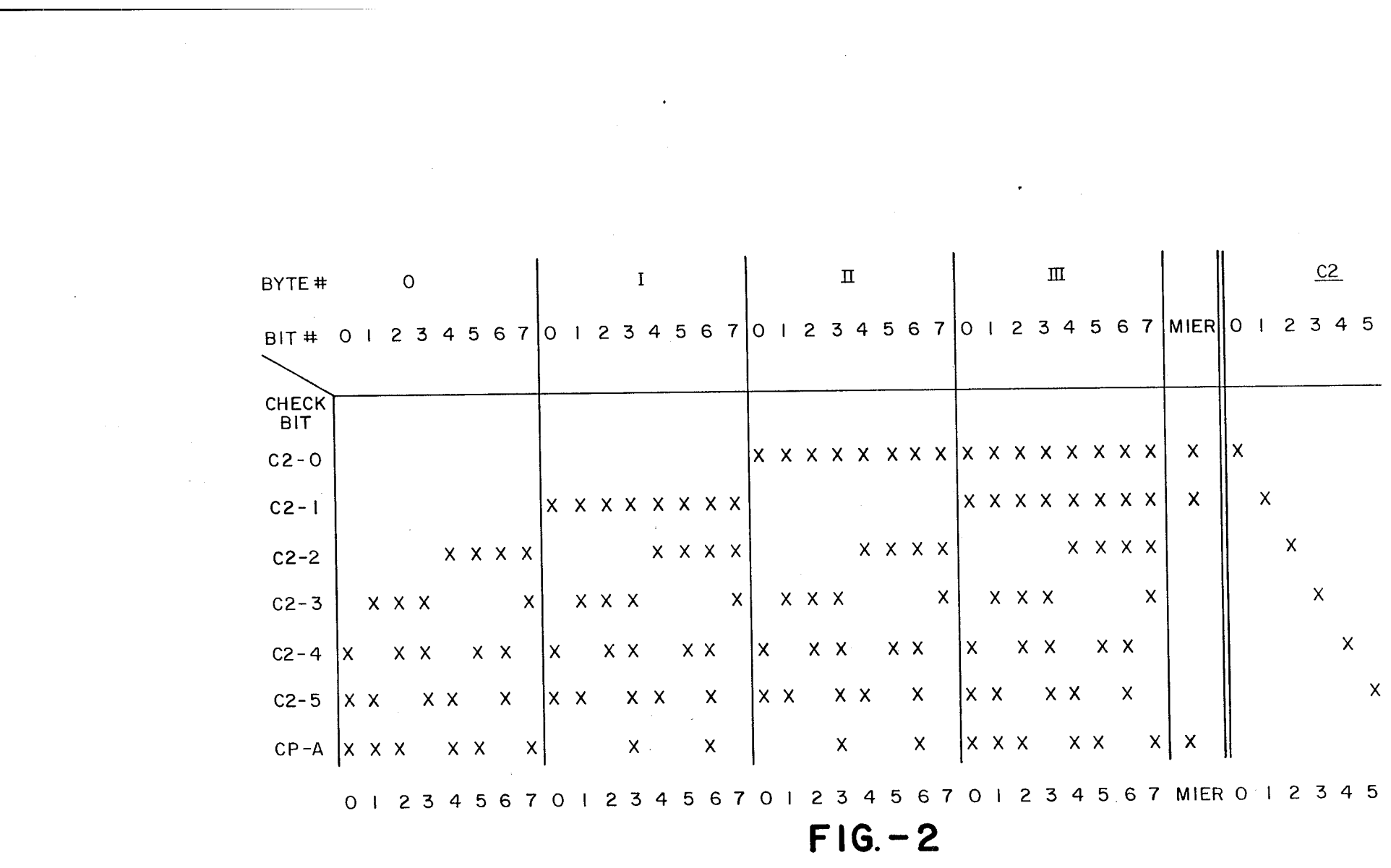

The exemplary array of FIG. 2 is illustrative of the operation of the second check bit generating circuitry 40 of FIG. 1. The array illustrates one respective representative 4-byte checking block. The respective eight bits of each respective byte of data signals in the representative checking block are divided in the array into four eight bit bytes labelled 0, I, II and III. Individual bits within each byte are labelled 0 through 7. A bit labelled MIER represents the move-in error bit (M) for the checking block. The array illustrates the relationship between the data signals (d) and the MIER bit (M) to the second set of ECC code check bit signals (C2).

More specifically, the illustrative array of FIG. 2 is representative of a network of exclusive OR logic gates coupled to receive the data signals (d) and an MIER bit (M) as inputs and to provide the respective second set of ECC code check bit signals (C2) as outputs. The manner of constructing the network and its operation will be understood by those skilled in the art and need not be described in detail herein.

Referring once again to FIG. 1 and to the bottom row of the array of FIG. 2, it will be appreciated that, in addition to providing on lines 44 signals (d, C2, M), the second check bit generating circuitry 40 also provides a first check parity bit CP-A as will be explained below. Furthermore, parity signals (p) also are provided on lines 44 in order to cover the data signals (d).

In operation, the second check bit generating circuitry 40 of FIG. 1 generates each check bit in the second set (C2) from a subset of the data signals (d) in the respective checking block. Referring to the array of FIG. 2, reading across the top of the array, each respective data bit corresponds to a (vertical) column of "X's" in the array directly beneath the respective data bit.

Similarly, the MIER bit also corresponds to a column of "X's" in the array directly beneath the MIER bit. Conversely reading down the left side of the array, each respective check bit in the second set (C2) corresponds to a respective (horizontal) row of "X's" in the array directly to the right of the respective check bit.

Each respective occurrence in the array of an "X" at a respective intersection of a column corresponding to a respective data bit and a row corresponding to a respective check bit indicates that the respective data bit is used to generate the respective check bit. Similarly, where an "X" corresponding to the MIER bit appears in the respective row corresponding to the respective check bit, the MIER bit is used to generate the respective check bit. For example, data bits 0-7 of bytes I and III and the MIER bit are used to generate check bit C2-1. Furthermore, for example, check bit C2-3 is generated using respective bits 1, 2, 3 and 7 of bytes 0, I, II and III.

Each data bit and the MIER bit contribute to the generation of at least two check bits of the second set. For example, the MIER bit (M) contributes to the generation of both check bits C2-0 and C2-1. Thus, each check bit in the second set of check bits acts as a parity bit over a group of bits (either solely data bits or data bits plus the MIER bit) transferred from the op-cache 12, and each such bit is covered by a unique pattern of check bits. As will be understood from the discussion below, the second set of check bits (C2) are used to detect occurrences of errors in the data signals or the MIER bit (M) and to correct single bit errors.

Reading down the left side of the array once again, the bottom row of the array corresponds to the first check parity bit (CP-A). The data bits corresponding to "X's" in the bottom row of the array and the MIER bit are used to generate the first check parity bit. The first check parity bit (CP-A) is used to distinguish single bit errors from multiple bit errors.

The second set of ECC code check bit signals (C2) together with the first check parity bit (CP-A) can be used as described below to detect single or multiple bit errors in the data signals and the MIER bit (d, M) occurring in the main storage unit 14 or in a move-out queue RAM 50 described below. These signals (C2, CP-A) also can be used to correct error occurrences involving only single bits of data or only the MIER bit. Thus, the integrity of the MIER bit (M) is protected using the second set of ECC code check bits (C2) and the first check parity bit (CP-A).

The description which follows explains the transferring storage, checking, correcting and reporting associated with only one representative checking block within a respective line of data signals (d). Similar procedures apply and similar circuitry is used for each other checking block of a respective line of data signals. Therefore, although procedures and circuitry are described for only the 4-bytes of one representative checking block, it will be understood that similar procedures and circuitry are used for each 4-byte checking block of each 64-byte line of data signals (d) transferred between the op-cache 12 to the main storage unit 14.

Referring now to FIG. 1, signals (d, C2, M, CP-A, p) are provided on lines 44 to parity applying circuitry 46 which applies parity signals to cover signals (C2, M, CP-A). More particularly, one parity bit is applied to cover check bits $C_0$, $C_2$, $C_4$, and M, and another parity bit is applied to cover check bits $C_1$, $C_3$ $C_5$ and bit CP-A.

Signals (d, C2, M, and CP-A, p) then are provided on lines 48 to the move-out queue RAM 50. The move-out queue RAM 50 is described in detail in commonly assigned patent application Ser. No. 909,500, filed on Sept. 19, 1986, entitled, MOVE-OUT QUEUE BUFFER which is incorporated herein by this reference. Since the transfer of data from the op-cache 12 to the main storage unit 14 is a lower priority operation with respect to the transfer of data from the main storage unit 14 to the op-cache 12, the move-out queue RAM 50 is included in the data storage unit 10 so as to store several cycles of the signals (d, C2, M, CP-A, p) until they can be provided as described below to the main storage unit 14.

Since the move-out queue RAM 50 includes ample storage capacity to store signals (d, C2, M, CP-A, p) for a significant number of cycles, there is a possibility that errors will occur in the signals during their storage by the move-out queue RAM 50. Therefore, parity checking circuitry 52 is provided for checking the parity of the signals (d, C2, M, CP-A) provided by the move-out queue RAM 50 on lines 51 for provision to the main storage unit 14 and for reporting parity errors on line 54 to diagnostic circuitry which is not shown and which forms no part of the present invention. Gate 53 provides the remaining signals (d, C2, M, CP-A) on lines 56 to the main storage unit 14. Signals (d, C2, M, CP-A) are stored in the main storage unit 14 until, for example, the process control circuitry 16 causes them to be provided on lines 58 for transfer back to the op-cache 12 as described below.

At this point it is useful to note that, at the time that the data signals (d) are moved out of the op-cache 12 and are moved into the main storage unit 14, they generally are not identified with a particular process. Consequently, at that time the MIER bit (M) although it is identified with the data signals of a particular checking block, is not identified with a particular process either.

Subsequently, however, when the process control circuitry 16 causes the data signals (d) of the checking block to be moved out of the main storage unit 14 for transfer to the op-cache 12, the respective data signals (d) of the checking block are identified with a particular process. This is because the process control circuitry 16 ordinarily causes data to be transferred from the main storage unit 14 to the op-cache 12 only when a particular process requires its own data. Consequently, at that subsequent time the respective MIER bit (M) stored in the main storage unit 16 in conjunction with respective data signals of the checking block also is identified with the same known process.

Thus, when the data signals are provided on line 58 for transfer to the op-cache 12, the existence of errors in the respective data signals which occurred during storage in the op-cache 12 or in the course of the transfer from the op-cache 12 to the main storage unit 14 can be detected by checking the logical state of the MIER bit, and the data signals (d) containing those errors can be associated with a particular process. The ability to both detect such errors and to associate the particular data signals containing the errors with a particular process, as described below, advantageously can be used to simplify diagnostic procedures by permitting a process using erroneous data signals to be more quickly identified.

The second set of ECC code check bits (C2) and the first check parity bit (CP-A) can be used to detect errors in signals (d, C2, M, CP-A) occurring in the move-out queue RAM 50 or in the main storage unit 14. Errors, may occur, for example, due to alpha particle collisions which cause one or more bits within signals (d, C2, M, CP-A) to experience an unwanted change from one logical state to another logical state.

When the control process circuitry 16 causes the main storage unit 14 to provide signals (d, C2, M, CP-A) on lines 58, the data signals (d) are provided by gate 60 to parity applying circuitry 62 which applies parity to the data signals (d). The data signals plus parity (d, p) are provided on cable lines 64 to data bit toggling circuitry 66 which is used for toggling erroneous data bit signals. Circuitry described below identifies correctable errors in the logical state of respective data bits, if there are any such correctable errors, and provides on lines 84 signals which cause the data bit toggling circuitry 66 to toggle a correctable erroneous data bit to change its logical state from an erroneous state to a correct state.

Parity checking circuitry 68 is coupled to logic paths 64 between the main storage unit 14 and cable lines 65 which conduct the data signals (d) from the main storage unit 14 to the op-cache 12 in the course of the move-in of the data signals (d) to the op-cache 12. The parity checking circuitry 68 checks for occurrences of parity errors in the data signals (d) in the course of their transmission on the cables 65. Parity errors in the data signals (d) occurring in the course of their transfer are reported on line 70 to diagnostic circuitry which is not shown and which forms no part of the present invention. Although only one parity checking circuit 68 is shown in FIG. 1, it will be appreciated that additional parity checking circuits can be included to check for parity errors occurring at different temporally spaced locations along the logic paths 64 between the main storage unit 14 and the op-cache 12.

Gate 72 provides the MIER bit (M) to MIER bit toggling circuitry 74 which is used for toggling erroneous MIER bits. Circuitry described below identifies correctable errors in the logical state of the MIER bit, if there are any such correctable errors, and provides on line 86 signals which cause the MIER bit toggling circuitry 74 to toggle a correctable erroneous MIER bit to change its logical state from an erroneous state to a correct state.

Gate 81 provides signals (d, C2, M, CP-A) to syndrome generating circuitry 80. The syndrome generating circuitry 80 generates a syndrome (S) comprising a set of six syndrome bits. The syndrome generating circuitry 80 includes an exclusive OR logic gate network which, like the second check bit generating circuitry 40 can be illustrated and explained using the exemplary array of FIG. 2.

More particularly, each respective syndrome bit corresponds to a respective row of the array. For each respective row of the array, respective data bits corresponding to respective columns for which corresponding "X's" appear in the respective row, are used to generate a respective syndrome bit which corresponds to that respective row. The same is true for the MIER bit; where an "X" appears in a respective row under the MIER bit, the MIER bit also is used to generate a respective syndrome bit which corresponds to that respective row. Moreover, reading down the left side of the array, the respective check bit corresponding to the respective row also is used to generate the syndrome bit which corresponds to that respective row.

For example, a first syndrome bit corresponds to the top row of the array. Bits 0–7 of bytes number II and III and the MIER bit are provided as input signals to an exclusive OR logic gate network together with check bit C2-0 in order to generate the first syndrome bit. Furthermore, for example, a sixth syndrome bit corresponding to the sixth row of the array, is generated by providing as input signals to an exclusive OR logic gate network, bits 0, 1, 3, 4 and 6 of bytes 0, I, II and III of the checking block together with check bit C2-5. The manner in which an exclusive OR logic gate network is constructed and used to generate the syndrome (S) will be understood by those skilled in the art and need not be described in detail herein.

The syndrome (S) permits the detection of errors occurring in the move-out queue RAM 50 or in the main storage unit 14. It also permits the correction of such errors where an error has occurred in only a single data bit or only in the MIER bit. In the preferred embodiment, if the syndrome is all zeros (000000) then this means that no errors in the data signals (d) or in the MIER bit (M) have occurred in the move-out queue RAM 50 or in the main storage unit 14. If the syndrome is 001010, however, for example, then this means that an error has occurred in bit 5 of byte 0 of the checking block. This can be read from the array be noting that there are "X's" in rows two and four in the column directly beneath bit five of the byte 0. If, on the other hand, for example, the syndrome (S) is 000111 then this means that there is an error in bit 3 of byte 0. Moreover, if the syndrome is 001000 then this means that there is an error is in check bit C2-2. If the syndrome is 110000, for example, then this means that there an error is in the MIER bit. The syndrome (S) advantageously can be used to map occurrences in the move-out queue RAM 50 or in the main storage unit 14 of errors in the data signals (d) or the MIER bit (M) when there are single bit errors.

The CP-A bit is used in conjunction with the syndrome (S) to determine whether error occurrences involve only a single bit or multiple bits. More specifically, the syndrome generating circuitry 80 generates a second check parity bit (CP-B) by providing all of the data signals (d) and the MIER bit (M) and the second set of check bit signals (C2) together with the first check parity bit (CP-A) as inputs to an exclusive OR logic gate network which can be understood by reference to the array of FIG. 2, in a manner which will be understood by those skilled in the art. The CP-B bit is used as described below to determine whether there are single bit or multiple bit errors in signals (d, M, C2).

More specifically, the syndrome (S) and the second check parity bit (CP-B) are provided to error checking and correcting (ECC) control circuitry 82. In the preferred embodiment, the ECC control circuitry 82 reports occurrences of multiple (uncorrectable) errors on line 83 to diagnostic circuitry, which is not shown and which forms no part of the present invention, when the second check parity bit CP-B bit is in a logical zero state and the syndrome (S) includes at least one non-zero bit. When the CP-B bit is in a logical one state, and the syndrome (S) comprises all logical zero state bits then the CP-B bit is in error, and the circuitry 82 sends respective signals on respective lines 84 and 86 respectively indicating that there are no errors in either the data signals (d) or in the MIER signal (M). If the CP-B bit is in a logical zero state and the syndrome (S) includes all logical zero state bits, then the circuitry 82 provides respective signals on respective lines 84 and 86 respectively indicating that there are no errors in either the data signals (d) or in the MIER bit (M).

When the second check parity bit (CP-B) is in a logical one state and the syndrome (S) includes one or more logical one state bits, then there is a correctable single bit error in the MIER bit (M), in the data signals (d) or in the check bits of the second set (C2). If the syndrome includes bits in the following logical sequence: 110000, then the MIER bit (M) is in error; reading down the row of the array of FIG. 2 directly beneath the MIER bit, it will be appreciated that this syndrome bit sequence corresponds to "X's" appearing only in the top two rows under the MIER bit. In the case where the MIER bit is in error, the ECC control circuitry 82 provides on lines 86 signals causing the MIER bit toggling circuitry 74 to toggle the erroneous MIER bit (M) so as to correct its erroneous logical state.

When the second check parity bit (CP-B) is in a logical one state, and the syndrome (S) includes more than one bit in a logical one state (and the syndrome does not comprise the sequence 110000), then a bit from the checking block of data signals (d) is in error. For example, the syndrome (S), comprising a bit sequence 110011, indicates that data bit 0 of the byte III is in error. This can be determined from the array of FIG. 2 by noting that the column of the array directly under bit 0 of byte III includes "X's" only in rows zero, one, four and five. In the case where there is a single bit data error, the ECC control circuitry 82 provides on lines 84 signals causing the data bit toggling circuitry 66 to toggle the erroneous data bit so as to correct its erroneous logical state.

When the second check parity bit (CP-B) is in a logical one state, and the syndrome (S) includes only one bit in a logical one state, then a check bit from the second set (C2) is in error. For example, the syndrome 000100 indicates that check bit C2-3 is in error. This can be determined from the array of FIG. 2 by noting that the column directly under C2-3 includes an "X" only in row three.

Once the ECC control circuitry 82 has provided respective signals on respective lines 84 and 86 either indicating that there are no correctable errors in the data or MIER signals or causing respective circuits 66 or 74 to correct erroneous bits, the data signal toggling circuitry 66 provides the data signals (d) (including any bits which have been toggled) to the first check bit generating circuitry 20, and the MIER bit toggling circuitry 74 providesthe MIER bit (M) (whether toggled or not) to the MIER bit reporting circuitry 76.

The first check bit generating circuitry 20 once again generates a first set of check bits (C1) to cover the data signals. The MIER bit reporting circuitry 76 reports on line 78 to diagnostic circuitry, which is not shown and which forms no part of the present invention, the logical state of the MIER bit (M). As discussed above, the logical state of the MIER bit provides a record of uncorrectable errors which occurred either while the data signals were stored in the op-cache 12 or in the course of their transfer from the op-cache 12 to the main storage unit 14.

The reporting of an uncorrectable error in the data signals (d) either by the ECC control circuitry 82 on line 83 or by the MIER bit reporting circuitry 76 on line 78 will cause the process control circuitry 16 to disable the transfer of the data signals (d) to the op-cache 12. Since the source of the uncorrectable error in the data signals (d) generally can be traced to either the move-out from the op-cache 12 (in which case an MIER error is reported on line 78) or to storage in the main storage unit 16 (in which case an uncorrectable error is reported on line 83), diagnostic processes directed to diagnosing the source cause of the error are simplified. Therefore, the apparatus and method of the present invention advantageously permit the more efficient detecting and reporting of data signal errors occurring either in the op-cache 12 or in the course of data signal transfer from the op-cache 12 to the main storage unit 14.

It will be understood that the above-described embodiment is merely illustrative of many possible specific embodiments which can represent the principles of the invention. Numerous and varied other arrangements readily can be devised in accordance with these principles without departing from the spirit and scope of the invention. Thus, the foregoing description is not intended to limit the invention which is defined by the appended claims in which:

What is claimed is:

1. An apparatus for reporting errors in data stored in a memory apparatus of a data processor, comprising:
   first means for storing multiple digital first signals;
   second means for storing the multiple digital first signals and adapted for storing at least one digital second signal;
   third means for transmitting the multiple digital first signals substantially from the first means to said second means;
   fourth means, for testing, in the course of the transmitting of the first signals by said third means, for an occurrence of one or more errors in the multiple first signals and for providing at least one digital second signal in response to a detecting of an occurence;
   fifth means for transmitting the multiple first signals substantially from said second means to said first means;
   sixth means for testing, in the course of the transmitting of the multiple first signals by said fifth means, for an occurrence in said second means of one or more errors in a first set of signals including the multiple first signals, and the at least one second signal; and
   seventh means for correcting single bit errors detected by the sixth means in the first set of signals.
   eight means for providing at least one third signal in response to the at least one digital second signal in the course of the transmitting of the multiple digital first signals by said fifth means.

2. The apparatus of claim 1 wherein said first means comprises a cache memory.

3. The apparatus of claim 1 wherein said second means comprises a main storage unit.

4. The apparatus of claim 1 wherein said fourth means includes:
   first means for applying at least one first parity signal to said multiple digital first signals; and
   first checking means for receiving said multiple digital first signals and said at least one first parity signal and for detecting an occurrence of one or more errors in said multiple digital first signals.

5. The apparatus of claim 1 wherein said fourth means includes:
   means for testing for an occurrence in said first means of one or more errors in said multiple first signals.

6. The apparatus of claim 1 and further comprising:

means for receiving said digital first signals transmitted by said third means and for delaying a provision of said digital first signals to said second means.

7. The apparatus of claim 6 wherein said means for receiving and delaying is adapted for receiving said at least one digital second signal and for delaying a provision of said at least one digital second signal to said second means.

8. The apparatus of claim 1 wherein said sixth means further comprises:
means adapted for receiving from said second means the multiple first signals and the at least one second signal and for generating a syndrome comprising a collection of respective binary signals each individually taking on either of two binary states.

9. The apparatus of claim 1 and further comprising:
ninth means for providing at least one fourth signal in response to a detection by said sixth means of multiple occurrences of errors in the first set of signals.

10. A method for reporting an occurrence, in a memory apparatus of a data processor system, of one or more errors in multiple digital first signals transmitted between a first means for storing said signals and a second means for storing said signals, which comprises the following steps:
storing the multiple first signals in the first means;
transmitting the multiple first signals from the first means to the second means;
in the course of said step of transmitting the first signals from the first means to the second means, testing for occurrences of one or more errors in the multiple first signals;
providing at least one digital second signal in response to a detection of an occurrence of one or more errors in the multiple first signals;
storing the multiple first signals and the at least one second signal in the second means;
transmitting the multiple first signals from the second means to the first means; and
testing for occurrences, occurring in the course of said second step of storing, of one or more errors in a first set of signals including the multiple first signals and the at least one second signal;
correcting single bit errors detected in the first set of signals; and
providing at least one third signal, in the course of said step of transmitting the multiple first signals from the second means to the first means, in response to the at least one digital second signal;

11. The method of claim 10 and further comprising the step of:
providing at least one fourth signal in response to a detection of occurrences of multiple errors in the first set of signals, the detected multiple errors occurring in the course of said second step of storing.

* * * * *